Patented Nov. 6, 1951

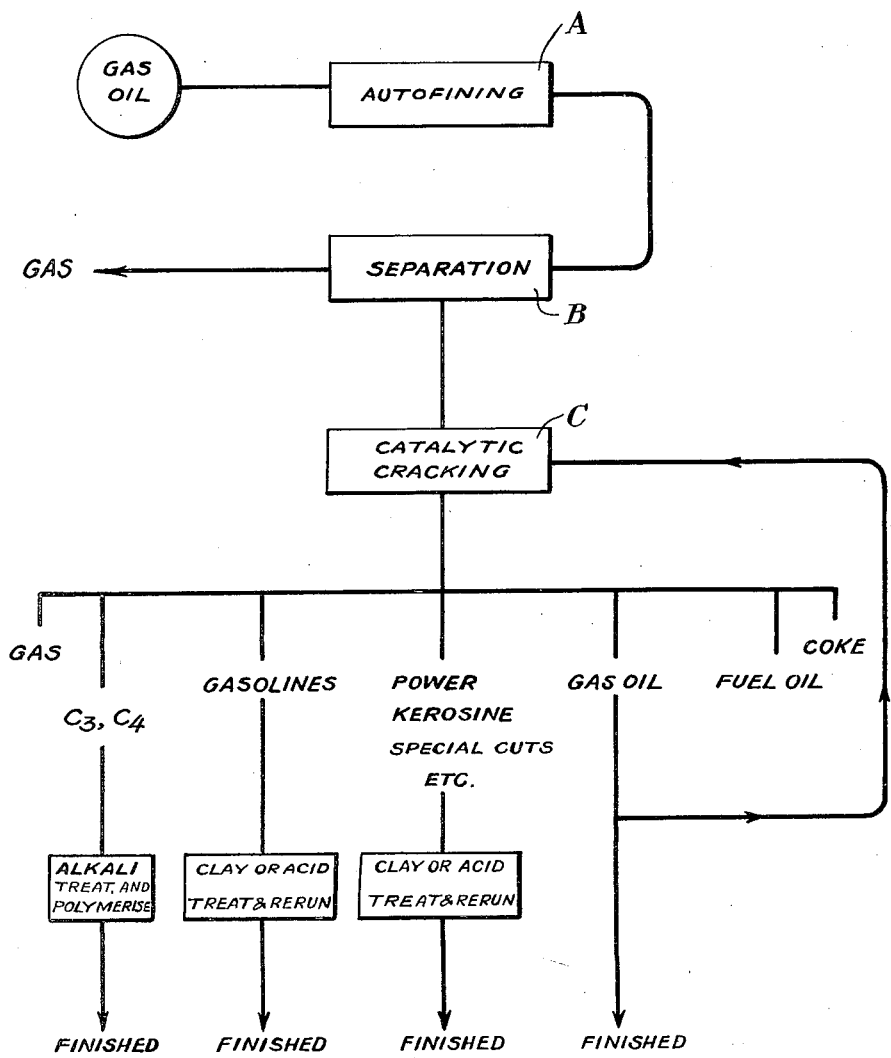

2,574,449

UNITED STATES PATENT OFFICE 2,574,449

PROCESS OF CATALYTIC DESULFURIZATION OF NAPHTHENIC PETROLEUM HYDROCARBONS FOLLOWED BY CATALYTIC CRACKING

Henry Thomas Lorne and Frederick William Bertram Porter, Sunbury on Thames, England, assignors to Anglo-Iranian Oil Company Limited, London, England, a British joint-stock corporation Application November 4, 1949, Serial No. 125,512
In Great Britain November 9, 1948

3 Claims. (Cl. 196—52)

This invention relates to the catalytic cracking of petroleum hydrocarbons.

It has been found that when petroleum fractions, such as gas oils and wax distillates, containing an appreciable content of sulphur are catalytically cracked, the cracked products also have a high sulphur content. Various processes have been proposed for the removal of sulphur from such feedstocks but such processes have either required the use of considerable quantities of refining agents or the provision of a hydrogen-producing plant. In the result, it has been found more economic and convenient to treat the various products of the cracking operation for the removal of sulphur, since the amount of residual sulphur that can be tolerated varies with the different products. Nevertheless, if an economic and easily operated process were available for the removal of sufficient sulphur from the feedstock to dispense with or substantially reduce the need for the treatment of the products for the removal of sulphur, such process would prove extremely useful. Not only would the subsequent treatment of the products be more economical, but it would also be possible to utilise catalysts in the cracking operation which are poisoned by sulphur bodies. It is the principal object of the present invention to provide such a process.

According to the process of the invention, a petroleum fraction is passed in vapour form in admixture with hydrogen to a desulphurisation zone wherein it is contacted with a catalyst which combines activity for dehydrogenation of naphthenes to aromatics with activity for the conversion of organically combined sulphur to hydrogen sulphide and which is not poisoned as a catalyst by the presence of sulphur compounds, at a temperature and at a pressure sufficient to effect the conversion of a considerable proportion of the sulphur contained in the feedstock into hydrogen sulphide and to produce a hydrogen-rich gas mixture which is separated and recycled to the desulphurisation zone at a rate sufficient to maintain the necessary partial pressure of hydrogen therein, the hydrogen produced in the desulphurisation zone constituting the whole of the hydrogen fed to said zone, and the desulphurised feedstock is then passed to a catalytic cracking zone.

The hydrogen necessary for the desulphurisation reaction is under the conditions of the process derived from the feedstock and such a desulphurisation process will hereinafter be referred to as an "Autofining" process.

The autofining reaction is advantageously carried out at a temperature of between 650–800° F. and at a pressure of between 25–500 lb./sq. in.

The space velocity may be varied within wide limits dependent upon the catalyst activity and the degree of desulphurisation required but space velocities above 10.v/v/hr. are not in general satisfactory.

Suitable catalysts are metal sulphides and oxides, especially those of the 6th group, either alone (for example, chromium oxide and tungsten sulphide) or in admixture with other sulphides or oxides (for example as pellets consisting of two parts tungsten sulphide with one part nickel sulphide) or in combination with other sulphides or oxides (for example cobalt molybdate or thiomolybdate) or mixed with or deposited on a porous carrier such as natural or processed bauxite, activated alumina and kieselguhr. The preferred catalyst consists of cobalt molybdate supported on alumina.

The separation of the gaseous fraction may be effected by cooling the distillate at the reaction pressure when it has been found that the hydrogen sulphide contained in the separated gas builds up to an equilibrium constant after which the gas may be recycled to the reaction zone without increase in its content of hydrogen sulphide, the hydrogen sulphide being thereafter dissolved in the products until it is depressurised. If desired, however, the hydrogen sulphide may be removed from the recycled gas by any of the usual methods. If desired, also, the gases may be submitted to treatment to increase the relative proportion of hydrogen therein, as for example by passage through an oil tower.

One example of the process of the invention as applied to a gas oil feedstock will now be described with reference to the accompanying diagram.

The gas oil feedstock is passed to an autofining zone "A" maintained under the conditions hereinbefore specified, and the products passed to a separating zone "B" where the products are separated into gas and a liquid product. The liquid product is then passed to a catalytic cracking zone "C" and the products of the cracking reaction fractionated to yield a light gas, $C_3$ and $C_4$ hydrocarbons, gasoline, a kerosine fraction, a gas oil, fuel oil and coke.

As an example of the effect of autofining on the products of catalytic cracking, a gas oil feedstock of sulphur content 0.98% wt. was catalytically cracked over a synthetic silica-alumina gel at 55% D+L conversion to give a 430° F. E. P. gasoline having sulphur content of 0.06% wt., and a residue above 430° F. having a sulphur content of 1.10% wt. After autofining as described above, this same gas oil feedstock had its sulphur content reduced to 0.2% wt., and this gas oil, on catalytic cracking over synthetic silica-alumina gel at 55% D+L conversion, yielded a 430° F. E. P. gasoline with a sulphur content of 0.01% wt., and a residue with a sulphur content of 0.2% wt.

As a second example, a wax distillate feedstock having a sulphur content of 1.77% wt., on catalytic cracking at 55% D+L conversion over a synthetic silica-alumina gel yielded a 430° F. E. P. gasoline of sulphur content of 0.13% wt., a gas oil (boiling range 430-635° F.) of 2.03% wt. sulphur content, and a residue above 635° F. of 2.01% wt. sulphur content. This same wax distillate had its sulphur content reduced to 0.6% wt. on autofining by the method already described, and this autofined feedstock when catalytically cracked under the same conditions as for the untreated material gave a 430° F. E. P. gasoline of sulphur content 0.03% wt., an intermediate gas oil cut of sulphur content 0.7% wt. and a residue above 635° F. of sulphur content 0.7% wt.

It is a feature of the invention that the products are suitable for use after only very light treatments. Thus, the C₃ and C₄ hydrocarbons need only be given an alkali treatment before being utilised for synthesis purposes. For example, they may be passed to a polymerisation zone for the production of sulphur-free polymers. The gasoline need only be given treatment, for example, with clay or acid, to remove potential gum-forming constituents and redistilled for the production of a finished gasoline. The fraction boiling within the kerosine range has a greatly reduced sulphur content and may be incorporated in heavy aromatic type blends, for example power kerosine.

If desired, heavy aromatic fractions may be separated from the cracked products and used for the production of semi-pure hydrocarbons.

The gas oil fraction may be recycled to the catalytic cracking zone until it is destroyed. The recycle stock is frequently used as furnace oil distillate or as a diesel fuel component and the recycled stock obtained by cracking an autofined gas oil finds wider application in this respect in view of its reduced sulphur content.

We claim:

1. In a continuous process for the production of catalytically cracked products of low sulphur content from a sulphur-and-naphthene-containing feedstock boiling above the gasoline range wherein the feedstock is first contacted in vapor form in a reaction zone at an elevated temperature and pressure in the presence of hydrogen with a dehydrogenation-hydrogenation catalyst which is immune to sulphur poisoning and combines activity for the dehydrogenation of naphthenes in said feedstock to aromatics with activity for the hydrogenation of organically combined sulphur in the feedstock to hydrogen sulphide, the method of operating the process so that it will be self-supporting with respect to the amount of hydrogen needed and produce a desulphurized feedstock for passage to the catalytic cracking zone, said desulphurized feedstock having, except for lowered sulphur content, properties and boiling range substantially the same as the feedstock, comprising the steps of passing the feedstock to be treated through said reaction zone at a space velocity not in excess of 10 v/v/hr. and contacting the feedstock therein with said catalyst and with hydrogen derived solely from the feedstock, maintaining a selected temperature in said zone between about 650° F. to about 800° F. at which hydrogen is continuously produced from said feedstock, maintaining a selected pressure in said zone between about 25 to about 500 lbs./sq. in. gauge, said selected temperature and pressure being correlated to provide a net production of hydrogen at least sufficient to maintain the pressure in said zone substantially constant, separating a hydrogen-rich gas mixture from the treated feedstock, recycling said hydrogen-rich gas mixture to the reaction zone to constitute the whole of the hydrogen supplied to said zone, the hydrogen recycle rate being sufficient to maintain the necessary partial pressure of hydrogen in said zone, passing the treated feedstock to a catalytic cracking zone, catalytically cracking the treated feedstock in said cracking zone, and recovering substantially sulphur-free products from the products of the cracking reaction.

2. The process of claim 1 wherein the hydrogen-rich gas mixture separated from the feedstock is obtained by cooling the effluent of the desulphurization zone at the reaction pressure whereby hydrogen sulphide formed in the resulphurizing zone is thereafter dissolved in the products until they are depressurized.

3. The process of claim 1 wherein the catalyst employed is cobalt molybdate supported on alumina.

HENRY THOMAS LORNE.
FREDERICK WILLIAM BERTRAM
PORTER.

REFERENCES CITED

The following references are of record in the file of this patent:

UNITED STATES PATENTS

| Number | Name | Date |
|---|---|---|
| 2,355,366 | Conn | Aug. 8, 1944 |
| 2,487,466 | Nahin | Nov. 8, 1949 |